Figure 1:
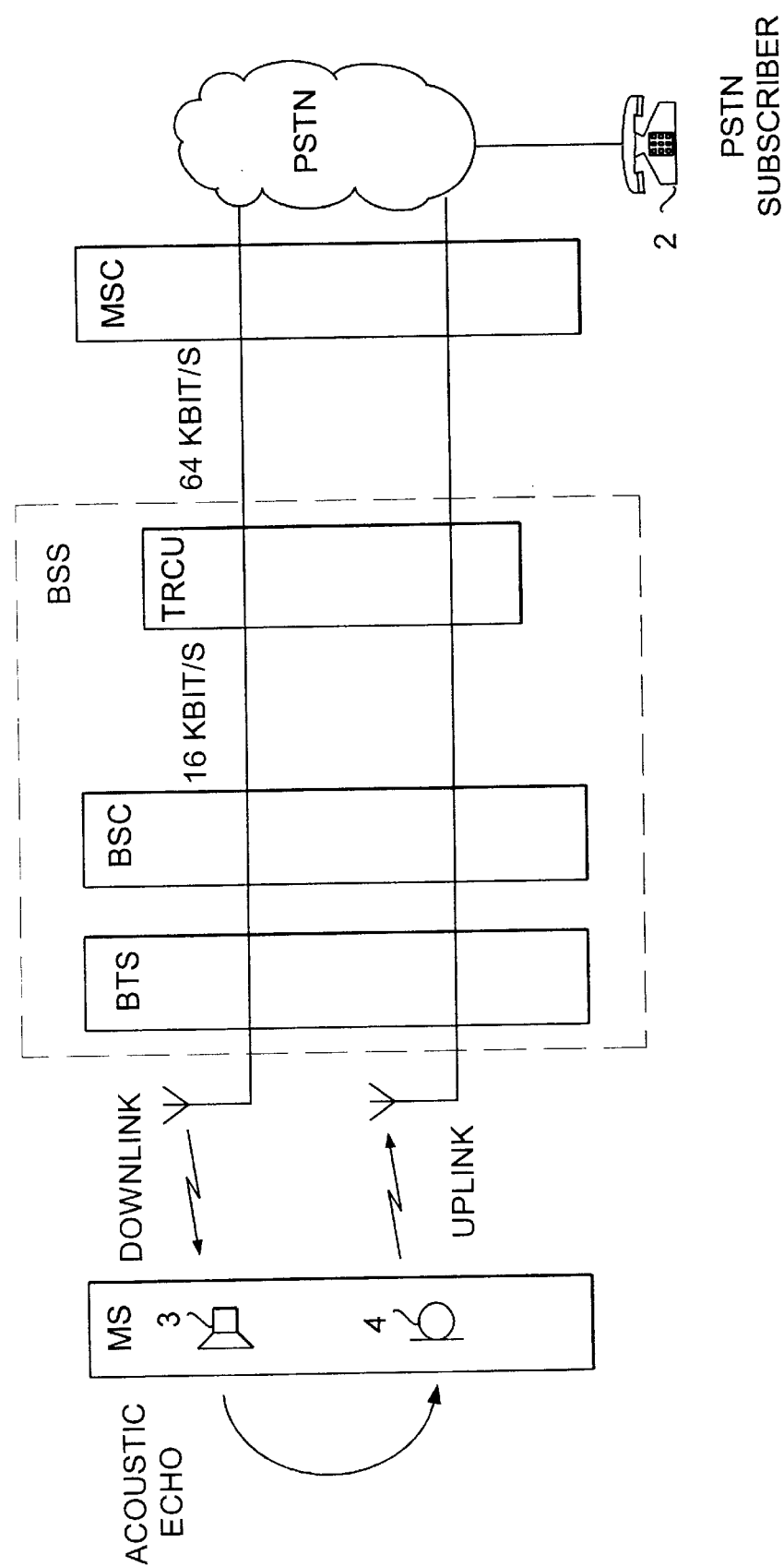

United States Patent [19]
Suvanen et al.

[11] Patent Number: 6,081,732
[45] Date of Patent: Jun. 27, 2000

[54] ACOUSTIC ECHO ELIMINATION IN A DIGITAL MOBILE COMMUNICATIONS SYSTEM

[75] Inventors: Jyri Suvanen; Olli Kirla, both of Helsinki, Finland

[73] Assignee: Nokia Telecommunications Oy, Espoo, Finland

[21] Appl. No.: 08/973,935

[22] PCT Filed: Jun. 7, 1996

[86] PCT No.: PCT/FI96/00340

§ 371 Date: Dec. 8, 1997

§ 102(e) Date: Dec. 8, 1997

[87] PCT Pub. No.: WO96/42142

PCT Pub. Date: Dec. 27, 1996

[30] Foreign Application Priority Data

Jun. 8, 1995 [FI] Finland ................................ 952833

[51] Int. Cl.[7] .................................................. H04B 7/00
[52] U.S. Cl. ...................... 455/570; 455/561; 455/296; 379/407; 370/289
[58] Field of Search ...................... 455/570, 569, 455/561, 575, 67.3, 70, 403, 422, 423, 424, 425, 296, 79; 379/406, 407, 408, 409, 410; 370/286, 287, 288, 289

[56] References Cited

U.S. PATENT DOCUMENTS

| 5,222,251 | 6/1993 | Roney, IV et al. . |
| 5,995,827 | 11/1999 | Gitlin et al. ............................ 455/570 |

FOREIGN PATENT DOCUMENTS

| 2 256 351 | 12/1992 | United Kingdom . |
| 93/22844 | 11/1993 | WIPO . |

OTHER PUBLICATIONS

GSM System for Mobile Communications; Michel Mouly, Marie Bernadette Pautet, 1992, pp. 216, 232–234, 249–259.
Recommendation GSM 05.04, Jan. 1991, pp. 1–3.
Recommendation GSM 05.05, Mar. 1991, pp. 1–19.
Recommendation GSM 05.10, Jan. 1991, pp. 1–6.
Patent Abstract of Japan, vol. 16, No. 550, E–1292, Abstract of JP,A, 4–207825 Nov. 19, 1992.

*Primary Examiner*—Reinhard J. Eisenzopf
*Assistant Examiner*—Lester G. Kincaid
*Attorney, Agent, or Firm*—Pillsbury Madison & Sutro

[57] ABSTRACT

A method and device for eliminating acoustic echo in a digital mobile communications system, which system includes a mobile station and a fixed mobile network in which speech signal transmission occurs on a radio path in an uplink direction from the mobile station to the fixed mobile network, and in a downlink direction from the fixed mobile network to the mobile station, and in which a speech coding method is employed on the radio path. Acoustic echo is eliminated by: eliminating acoustic echo, in signals transmitted in the uplink direction, of signals transmitted in the downlink direction, by means of an echo canceller in the mobile station, and in the fixed mobile network, eliminating acoustic residual echo, in signals transmitted in the uplink direction, of signals transmitted in the downlink direction as follows: monitoring voice activity in signals transmitted in the downlink direction; monitoring whether a double-talk situation is present or not; replacing signals transmitted in the uplink direction with noise after a predetermined delay when detecting voice activity in signals transmitted in the downlink direction; terminating the replacing of signals transmitted in the uplink direction with noise after a predetermined delay when detecting the end of voice activity in signals transmitted in the downlink direction; and preventing signals transmitted in the uplink direction from being replaced with noise when a double-talk situation is detected.

12 Claims, 5 Drawing Sheets

ACOUSTIC ECHO ELIMINATION IN A DIGITAL MOBILE COMMUNICATIONS SYSTEM

This application is the national phase of international application PCT/FI96/00340 filed Jun. 7, 1996 which designated the U.S.

The invention relates to a method and arrangement for eliminating acoustic echo generated in a mobile station in a digital mobile communications system.

On end-to-end connections of a data transmission system, such as a telephone network, long propagation delays often occur, as a result of which e.g. echo is detected in the case of normal speech when a signal is reflected from the far end of the connection back to the transmitting party.

Mainly two factors contribute to generating an echo: acoustic echo between the receiver and the microphone of a telephone, and electric echo, which is generated in the transmission systems of the transmission and reception directions of the connection.

Major sources of electric echo are hybrid circuits (2-wire to 4-wire transformers), which are located in terminal exchanges or at the remote subscriber stages in the fixed network. Subscriber lines of a fixed network are usually 2-wire lines for economical reasons. Connections between exchanges, in turn, are usually 4-wire lines.

As defined herein, the far end is that end of the transmission connection to which the speaker's own end returns as an echo, and the near end is that end of the transmission connection from which the echo is reflected back. Typically, the near end is a mobile station and the far end is another party, such as a PSTN subscriber.

Problems caused by returned echo are usually endeavoured to eliminate by means of an echo canceller or an echo suppressor. The echo canceller is a device processing a signal, such as a speech signal and used for reducing the echo by reducing the estimated echo from the echo (signal) occurring on the connection. The echo suppressor, in turn, disconnects the signal arriving from the near end when echo is present.

Prior art digital mobile communications systems are provided with echo cancellers, which prevent an echo returning from the public switched telephone network (PSTN) from being transmitted to the mobile subscriber. In mobile exchanges, echo cancellers of this kind are usually placed in the trunk circuits between the exchanges.

Echo returning from a mobile station is usually cancelled by means of an echo canceller placed in the actual mobile station. Such an echo canceller is usually based on an adaptive filter or comparing the levels of an output signal and an input signal. There are a large number of mobile stations in use nowadays in which the echo cancellation does not work sufficiently well, but a relatively low level, yet disturbing echo is transmitted to another party. In principle, the problem can be reduced by developing echo elimination methods for mobile stations, but it mainly improves the situation as far as new mobile station are concerned. Instead, it is difficult to update the software or equipment of the mobile stations that are already in use, because the mobile stations are already in possession of their users, and collecting them for service measures is time-demanding and costly. In the mobile communications system, there will thus always be such mobile stations whose echo elimination does not work sufficiently well, but causes disturbing echo to the other party. In digital mobile communications systems, speech transmission also takes place entirely digitally. From the point of view of the mobile network, the most limited resource is the radio path between the mobile stations and the base stations. In order to reduce the bandwidth required by one radio connection on the radio path, speech coding is employed in the transmission of speech, thus achieving a lower transfer rate, e.g. 16 or 8 kbit/s, compared with the transfer rate of 64 kbit/s typically used in the telephone networks. Both the mobile station and the mobile network must naturally comprise a speech encoder and a speech decoder for speech coding. On the side of the network, the speech coding functions may be placed in many alternative locations, such as at the base station or in association with the mobile exchange. Thus, in each mobile-terminating or -originating speech call, the speech connection is connected to a speech coder on the network side, for decoding a speech signal arriving from the mobile station (uplink direction) and encoding a speech signal transmitted to the mobile station (downlink direction).

In addition, a DTX mode (Discontinuous Transmission) is involved with speech transmission in some of the digital mobile communications systems. Its aim Is to improve the efficiency of the system by means of lowering the interference level by preventing transmission of the radio signal when it is not necessary from the point of view of information. The DTX mode is normally alternative to the normal mode, and a selection between these two modes is made call-specifically in the mobile communications network. In the DTX mode, speech is coded normally, e.g. 13 kbit/s when the user is speaking, and a remarkably lower bit rate, such as about 500 kbit/s, is used at other times. This lower bit rate is used for encoding information from the background noise on the transmitting side. On the receiving side, this background noise is regenerated to the listener, and it is therefore termed as comfort noise, so that the listener will not think the connection has been interrupted during pauses in transmission. The function that monitors at the transmitting end whether voice activity is present is termed as Voice Activity Detection VAD. The decision on whether a signal contains speech or background noise is typically based on a threshold value and comparing the measured signal energy.

Comfort noise is generated since the experience has shown that the listener is greatly disturbed when the background noise behind the speech ends abruptly. This would happen constantly in a discontinuous transmission. A way to avoid disturbing the listener is to produce artificial noise when no signal is received. The characteristics of this noise are updated regularly and transmitted to the receiving end with a speech coder which is located at the transmitting end.

Acoustic echo also occurs in this kind of digital mobile communications systems employing speech coding of lowered transmission rate, said echo being generated in the mobile station when a speech signal received from the other end propagates from the earpiece of the telephone to the microphone and back to the far end of the connection.

British Patent Application 2,256,361 discloses a mobile station in which an echo suppressor compares the levels of the downlink and uplink signals. When the level of the downlink signal exceeds the threshold level with respect to the uplink signal, and no voice activity is taking place in the uplink direction, the uplink signal is assumed to contain echo. The uplink frames are thus replaced with speech frames containing comfort noise, said speech frames being decoded as audio frames at the other end. Echo returning from the mobile station may thus be reduced.

According to U.S. Pat. No. 5,222,251 a hands-free device for a mobile station is provided with an echo suppressor which disconnects the signal coming from the hands-free device and supplies noise instead when the signal received from the hands-free device contains acoustic echo.

These prior art echo cancellers or echo suppressors relieve the problem caused by acoustic echo only in part of new mobile stations, but there will still be such old mobile stations and possibly other types of new mobile stations in the mobile communication network in which the elimination of acoustic echo is not sufficient. Thus, this prior art echo canceller does not either eliminate problems described above.

Japanese Patent Application 4-207,825 (Patent Abstracts of japan, Vol. 16, No. 550, p. 3) discloses a base station equipment of a radio system, provided with an adaptive echo canceller. The object is to completely avoid using an echo canceller in a mobile station.

The studies and measurements carried out by the inventor of the present application have shown, however, that an adaptive echo canceller placed on the mobile network side and based on an adaptive digital filter that models the echo path does not work in digital mobile communications systems as there are two speech codecs on the echo path (in the mobile station and the network) in a tandem. The signal-to-distortion ratio of a returning echo signal is thus extremely poor and the achieved attenuation of the echo signal is very low. According to the inventor's findings, an echo suppressor placed instead of an echo canceller in a network element is not an optimal solution either in case the mobile station does not have any echo canceller for reducing the echo level. The level of the returning echo is thus so high that the echo suppressor must be dimensioned in such a manner that its double-talk characteristics will be poor, that is, the echo suppressor easily cuts uplink speech during double-talk.

There is thus a strong need to carry out elimination of acoustic echo generated in a mobile station efficiently in all mobile stations regardless of the type of the mobile station and the echo canceller or echo suppressor it is using.

The object of the present invention is thus to carry out a method and arrangement for preventing acoustic echo generated in a mobile station and returning to a subscriber of a PSTN network or to another mobile subscriber.

This is achieved with a method of the invention for eliminating acoustic echo in a digital mobile communications system in which the uplink direction is the direction from the mobile station towards the fixed mobile network, and the downlink direction is the direction opposite thereto, and in which a speech coding method is employed on the radio path, the method comprising a step in which acoustic echo of downlink speech, occurring in an uplink signal is attenuated by means of an echo canceller in a mobile station. The method is characterized in that eliminating acoustic residual echo of downlink speech, returning from the mobile station in the uplink direction in a fixed mobile communications system comprises the following steps:

eliminating acoustic residual echo of downlink speech, returning from the mobile station in the uplink direction in a fixed mobile communications system as follows:
monitoring in the mobile network the voice activity in the downlink direction,
monitoring whether a double-talk situation is present or not,
replacing in the mobile network the uplink speech signal with noise after a predetermined delay when detecting voice activity in the downlink direction,
terminating replacing the uplink speech signal with noise after a predetermined delay when detecting the end of voice activity in the downlink direction,
preventing the uplink speech signal from being replaced with noise when a double-talk situation is detected.

Another object of the invention is a device for eliminating acoustic echo returning from the mobile station in a digital mobile communications system employing a parametric speech coding method for lowering the transfer rate at the radio interface, the mobile station comprising an echo canceller for attenuating acoustic echo. The echo canceller is characterized in that the device is an echo suppressor placed on the mobile network side eliminating residual echo of the echo canceller of the mobile station, the echo suppressor comprising a downlink voice activity detector (35) whose uplink direction is the direction from the mobile station (MS) towards the fixed mobile network and the downlink direction is the direction opposite thereto, a double-talk detector (301), means (302, 303) for replacing an uplink speech signal with noise after a predetermined delay when a voice activity is detected in the downlink direction.

In the invention, an echo suppressor or an echo suppressor function is placed in one network element of the mobile network, for eliminating acoustic echo generated in a mobile station, in addition to an echo canceller placed in the mobile station. In the invention, the echo elimination is distributed among the mobile station and the mobile network. In the mobile station, a basic attenuation is carried out for the acoustic echo signal by an adaptive echo canceller of the mobile station. The residual echo possibly remaining after the echo canceller of the mobile station is then eliminated with an echo suppressor of the invention by interrupting the propagation of the signal and supplying noise instead. By means of an echo suppressor of the invention, the disturbing acoustic residual echo can be eliminated efficiently independently of the quality of the echo elimination in the mobile station.

The echo suppressor of the invention may be a separate device or it may be located in connection with the speech coder of the mobile communication network, said speech coder being hereinafter termed as a transcoder. A device or function that provides echo elimination according to the invention is herein generally referred to as an echo suppressor regardless of the fact whether it is a separate device or a supplementary device or function in association with the transcoder. In connection with residual echo elimination, the echo suppressor is also generally referred to as non-linear processing (NLP) or a center clipper. The double-talk characteristics of the echo suppressor of the invention are similar to those of NLP, because the basic attenuation of acoustic echo is carried out already by an adaptive filter of the mobile station.

The echo suppressor monitors whether speech is present in the downlink direction. When speech is present in the downlink direction, it is possible that this downlink speech is returning from the mobile station as an acoustic echo superimposed to the uplink signal. The echo suppressor therefore prevents the uplink signal from propagating, upon detecting voice activity in the downlink direction, and generates instead of it background noise having the spectral characteristics and the intensity similar to those in the operating environment of the mobile station at each moment. This background noise is termed herein as comfort noise. Generating comfort noise must advantageously be started slightly before the acoustic echo returns from the mobile station to the echo suppressor. Therefore, generating comfort noise is started after a predetermined delay after downlink voice activity is detected, and it is continued as long as the downlink voice activity prevails. When the echo suppressor no longer detects voice in the downlink direction, it terminates generating comfort noise in the uplink direction and returns to normal uplink speech transmission after a predetermined delay, during which all of the acoustic echo has already returned from the mobile station to the echo suppressor.

In a preferred embodiment of the invention, generating and detecting comfort noise are distributed. The echo suppressor does not need to separate speech and background noise from each other from the received signal or calculate the level and spectrum of the background noise. All this information is found in comfort noise information transmitted by the mobile station, e.g. in SID Frames in the GSM system. This information describes the background noise of the mobile station when the mobile subscriber is not speaking and no echo is present. The echo suppressor stores this information and uses it for generating comfort noise for replacing the frames in which the echo suppressor has detected echo. Determining and detecting the background noise thus takes place in the mobile station, but generating the background noise is carried out in the echo suppressor. This saves processing in the echo suppressor.

The echo suppressor of the invention further has double-talk detector in the uplink direction. By means of double-talk detection, it is possible to prevent interrupting the speech of the mobile subscriber when the comfort noise is being generated. The double-talk detection functions as follows: If a sufficiently high signal level is detected in the uplink direction during generation of the comfort noise, the procedure immediately shifts to the double-talk mode. In the double-talk mode, the uplink signal is advantageously passed through after a slight attenuation. The attenuation is so slight that it will not make it more difficult to understand the speech of the mobile subscriber. Acoustic echo is also passed through in this situation, but it is not so disturbing since the returning acoustic echo has mixed with the speech of the mobile subscriber.

Figure 2:
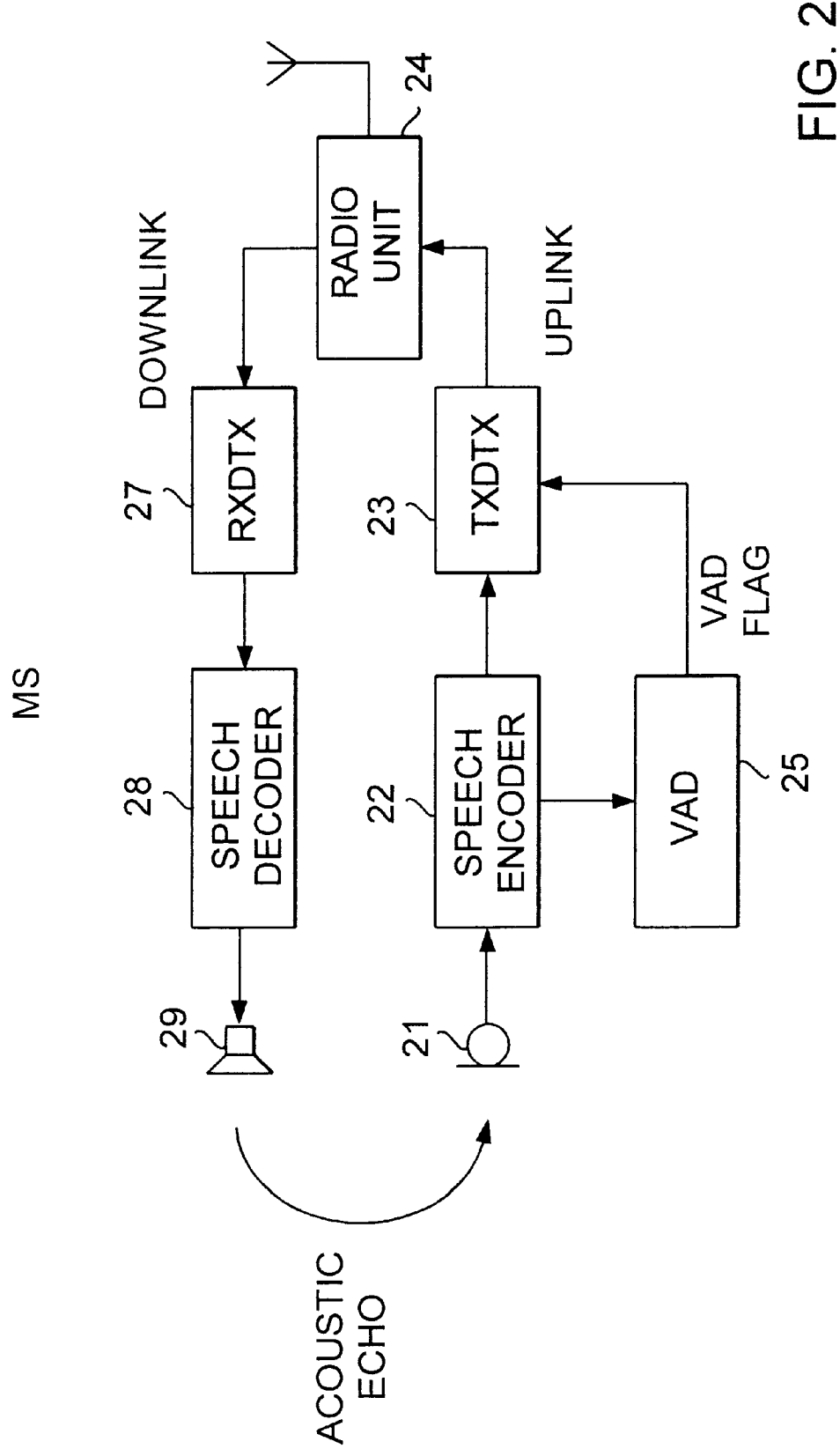
Figure 3:
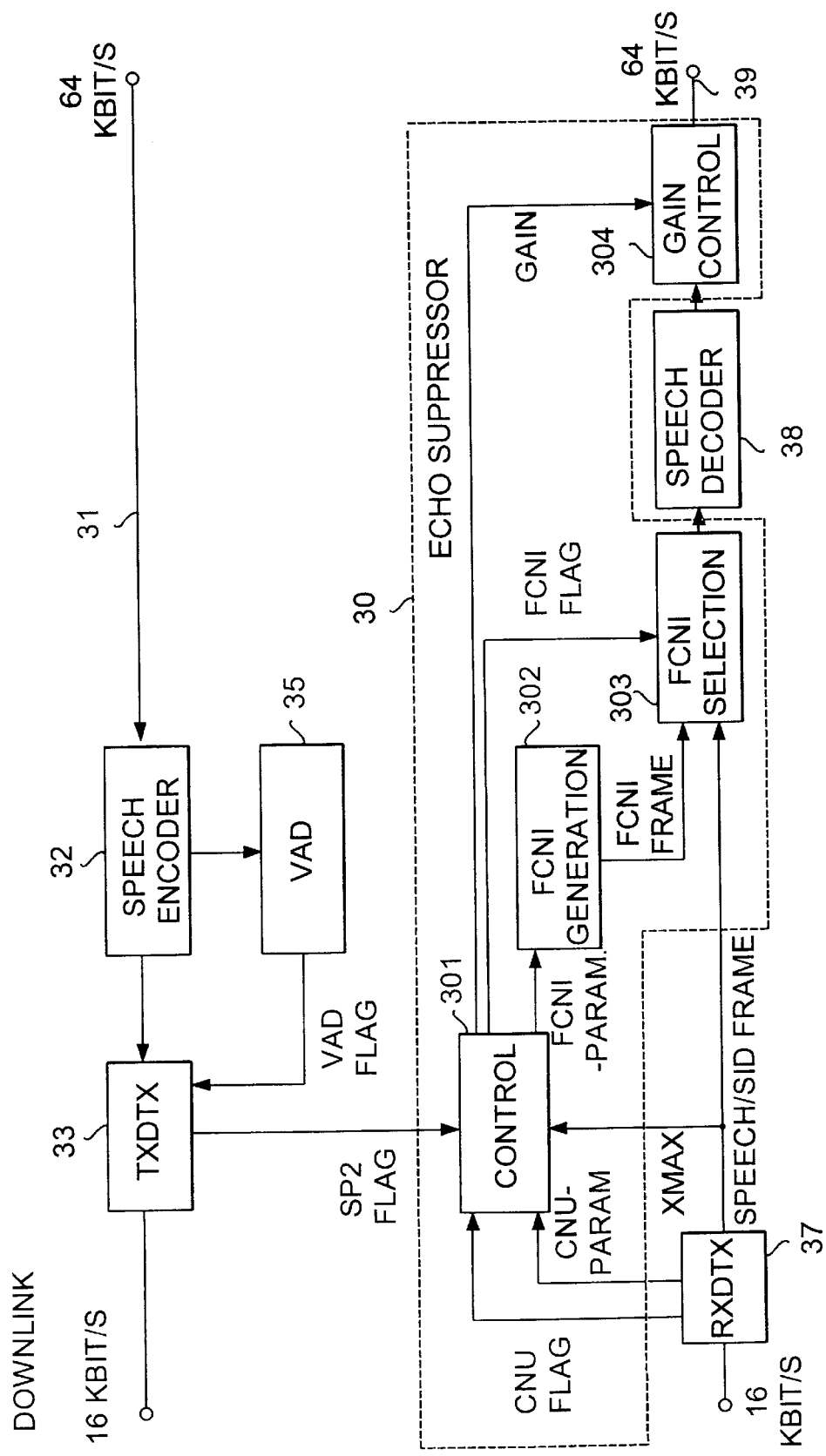
Figure 4:
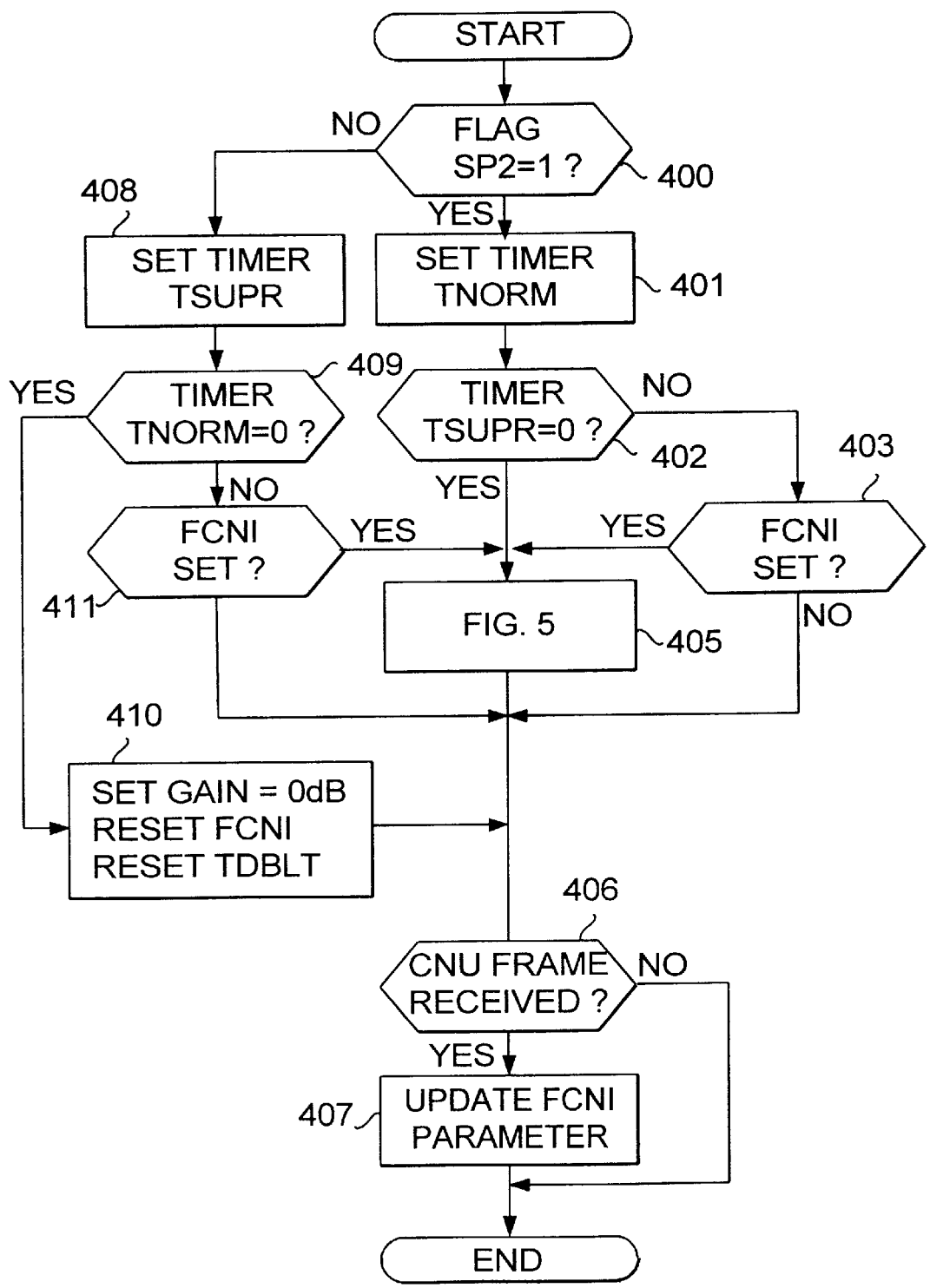
Figure 5:
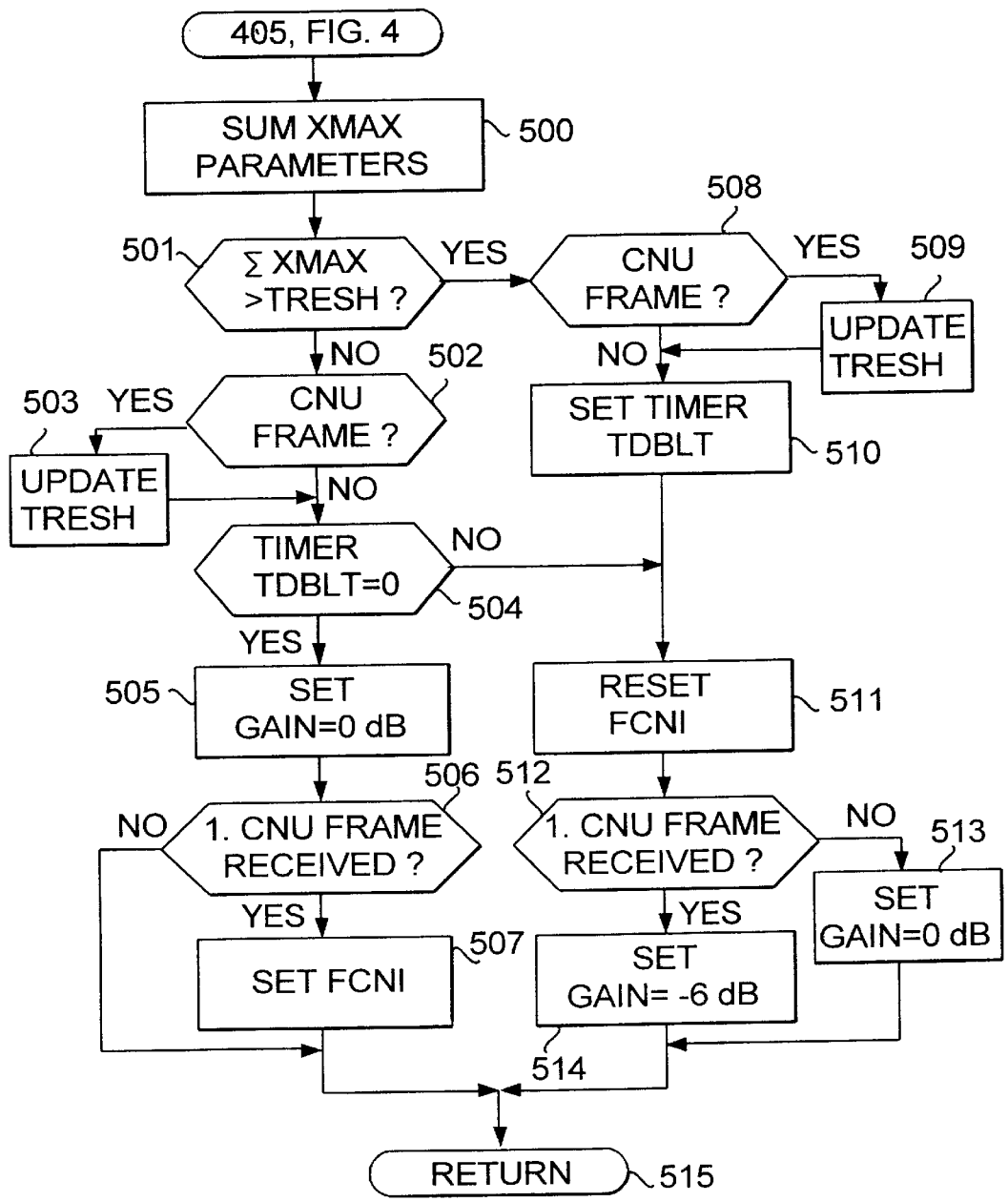

In the following, the invention will be explained by means of the preferred embodiments with reference to the attached drawings, in which FIG. 1 illustrates a digital mobile communications system, FIG. 2 is a block diagram showing the principle of a mobile station employing discontinuous transmission, FIG. 3 is a block diagram showing the principle of an echo suppressor of the invention, said echo suppressor being placed in the mobile network at the transcoder unit TRCU shown in FIG. 1, and FIGS. 4 and 5 are block diagrams illustrating the operation of the echo suppressor in FIG. 3.

The present invention may be applied in any mobile communications system employing digital speech transmission and speech coding techniques for lowering the transfer rate.

An example is the European digital mobile communications system GSM (Global System for Mobile Communication). The basic structure and operation are disclosed in ETSI/GSM recommendations. A more detailed description of the GSM system is found in the GSM recommendations mentioned above and the book "*The GSM System for Mobile Communications*", M. Mouly, M-B. Pautet, Palaiseau, france, 1992, *ISBN*:2-9507190-0-7, which are incorporated herein by reference.

In the following, the invention will be described by way of example of the GSM system. The invention is not limited thereto, however.

FIG. 1 shows briefly some of the basic elements of the GSM system. A mobile services switching centre MSC is responsible for switching incoming and outdoing calls, and it performs tasks similar to those of an exchange of a public switched telephone network (PSTN). It also carries out tasks typical of mobile telecommunications only, such as subscriber location management. Mobile radio stations i.e. mobile stations MS are connected to the MSC by means of base station system BSS. A base station system consists of base station controllers BSC and base stations BTS.

The GSM system is entirely digital, and speech and data transmission also take place entirely digitally. The speech coding presently used in speech transmission is RPE-LTP (Regular Pulse Excitation—Long Term Prediction), which utilizes both long-term and short-term prediction. Coding produces LAR, RPE and LTP parameters, which are transmitted instead of actual speech. Speech transmission is disclosed in the GSM recommendation in chapter 06, speech coding in particular in recommendation 06.10. In the near future, it may be possible to use other coding methods, as well, such as half-rate methods. Since the invention is not related to the actual speech coding method and is not dependent on it, it will not be paid closer attention to herein.

A mobile station must naturally have a speech encoder and speech decoder for speech coding. The implementation of the mobile station is not essential to the invention and it does not differ from the standard. The structure and operation of the mobile station will be described below, however, in connection with discontinuous transmission (DTX) with reference to FIG. 2.

Different speech coding functions on the fixed network side of the mobile communications system are typically concentrated in a Transcoder/Rate Adaptation Unit TRCU. The TRCU may be located in many alternative network elements at the manufacturer's option. The interfaces of the transcoder unit are a 64-kbit/s PCM (Pulse Code Modulation) interface (A interface) towards the mobile services switching centre MSC and a 16- or 8-kbit/s GSM interface towards the base station BTS. Regarding these interfaces, terms uplink direction and downlink direction are also used in the GSM recommendations, the uplink direction being the direction from the MS towards the MSC, and the downlink direction being the direction opposite thereto.

When the transcoder unit TRCU is placed remote from the BTS, the information is transmitted between the BTS and the TRCU in so-called TRAU frames, which are defined in GSM recommendation 08.60. In these frames, LAR, RPE and LTP speech coding parameters are transmitted, as well as different control bits including the control bits of the DTX mode described above. TRAU frames are not essential to the invention, however, and not paid closer attention to herein.

Discontinuous Transmission DTX

Discontinuous transmission, or DTX, is a method in which transmission to the radio path may be interrupted for the duration of pauses occurring in speech. This aims at decreasing the power consumption of the transmitter, which is extremely essential to the mobile station, and the general interference level on the ratio path, which has an effect on the capacity of the ratio system.

FIG. 2 is a block diagram showing the principle of a mobile station employing a normal transmission mode and a discontinuous transmission mode DTX. On the transmitting side, a microphone 21 converts an acoustic sound into an electric signal, which is supplied to a speech encoder 22. The speech encoder 22 carries out speech encoding to a lower rate e.g. by means of the RPE-LTP method producing speech parameters, such as LAR, RPE and LTP parameters which are transferred to a TXDTX processor 23, which forwards the speech frames every time in the normal transmission mode regardless of whether speech or mere background noise occurs in the signal produced by the microphone. The speech frames are transmitted to a radio unit 24, which comprises a transceiver and the other components and functions required by the radio path. The radio unit 24 transmits the speech frames as a radio frequency uplink signal over the radio interface to a base station BTS.

A mobile station may be commanded to the DTX mode with a command transmitted by the base station. When the MS is in the DTX mode, the Voice Activity Detection block VAD 25 finds out whether the speech parameters of the microphone signal contain speech or whether it is a question of mere background noise. The VAD function is defined in GSM recommendation 6.32 and it is mainly based on analysing the energy and spectral changes of the signal. The VAD 25 generates a VAD flag, whose state indicates whether the signal contains speech (VAD=1) or mere background noise (VAD=0). Provided that VAD flag=1, the function that is responsible for discontinuous transmissions on the transmitting side, that is, the TXDTX processor 23 (Transmit DTX) transmits normal speech frames. Provided that the VAD flag=0, the TXDTX transmits SID frames (Silence Descriptor) containing information on the background noise for comfort noise to be generated on the receiving side. A flag SP (speech) in the control bits of the transmitted frame indicates whether it is a question of a normal speech frame or a SID frame. When the state of the VAD flag changes into zero, that is, no speech is detected in the signal, the speech frames are converted into SID frames after a predetermined number of frames required for calculating the parameters for the background noise. The radio unit 24 transmits one SID frame (SP=0) after the last speech frame, whereafter the transmission to the radio path is terminated. The TXDTX processor 23, however, uninterruptedly continues generating SID frames containing noise information to the radio unit 24, which forwards one of these frames to the radio path for updating the noise parameters on the receiving side. These SID frames that update the noise parameters are hereinafter referred to as comfort noise updating frames, i.e. CNU frames. When the VAD 25 later detects speech from the parameters of the speech encoder 22, it sets the VAD flag to value 1, as a result of which the TXDTX processor 23 restarts continuous transmission of speech frames (SP=1).

The TXDTX processor 23 generates parameters representing the background noise from the speech parameters generated by the encoder 22. The TXDTX processor 23 selects as the noise parameters those parameters from the normal speech parameters that provide information on the level and spectrum of the background noise, that is, LAR co-efficients as well as XMAX parameters describing the maximum level of the sub-block of the speech frame. Mean values corresponding to the duration of four speech frames are further formed of these parameters. Each speech frame contains four XMAX parameters from which one value in common corresponding to the duration of four speech frames is calculated. These noise parameters are transmitted to the radio path in SID frames in the manner described above. Not all the parameters that are normally transmitted are thus transmitted, and part of the parameters are replaced with a SID code word consisting of zeroes. The other unnecessary parameters are also coded to the value zero. Generating comfort noise parameters is described in GSM recommendation 06.12.

The principle of the receiver of the mobile station MS is as follows. The radio unit 24 receives from the base station BTS a radio frequency downlink signal, and a downlink frame separated form said downlink signal is applied to a RXDTX processor (Receive DTX) that is responsible for the discontinuous transmission on the receiving side. In case the mobile station is in the normal transmission mode, the RXDTX processor 27 forwards the received speech frames to the speech decoder 28, which carries out speech decoding of the received parameters (e.g. LAR, RPE and LTP parameters). A decoded speech signal is converted at a receiver (loudspeaker) 29 into an acoustic signal. In case the mobile station MS is in the discontinuous transmission mode (DTX), the RXDTX processor 27 processes the frames received from the radio unit 24 in different ways depending on whether a normal speech frame or a SID frame is concerned. The RXDTX determines the frame type on the basis of the SP flag of the frame. In case the received frame SP=1, the RXDTX 27 forwards the speech frames to the speech decoder 28. In case the frame SP=0, the RXDTX 27 shifts into a state in which it generates speech frames containing comfort noise on the basis of the received noise parameters. The RXDTX updates the parameters used in generating comfort noise every time it receives a new SID frame. The speech decoder 28 decodes the speech frames "containing noise" by producing a signal which is converted by the loudspeaker or the receiver 29 into acoustic background noise similar to that occurring on the transmitting side. The fluctuation between speech conveyed by the background noise and complete silence, which may be very unpleasant to the listener is thus avoided in the DTX mode. Of course, in addition to the above, the MS also contains an echo canceller for attenuating acoustic echo.

The block diagram in FIG. 3 illustrates a speech coding unit which is located on the side of the fixed radio network, e.g. in the transcoder unit TRCU shown in FIG. 1. The block diagram of FIG. 3 only shows the functions and elements that are essential for explaining the invention. In addition, the speech coder and the transcoder may contain many other functions, such as processing of TRAU frames, rate adaptations, etc.

The upper part of FIG. 3 shows the functional units of the transmitting side, or the downlink direction, which are a speech encoder 32, a VAD 35 and a TXDTX processor 33. The structure and operation of these units is substantially similar to the speech encoder 22, VAD 25 and TXDTX processor 23 of the mobile station in FIG. 2. In this case, however, the input of the speech encoder 32 is a 64-kbit/s digital speech signal from the mobile services switching centre (A interface). The speech encoder 32 encodes the signal 31 to speech parameters (e.g. using the RPE-LTP method) which are transmitted in the speech frames to the TXDTX processor 33. In case the normal transmission mode is on in the downlink direction, the TXDTX 33 transmits all the speech frames to the radio unit located at the base station BTS. If the discontinuous transmission mode DTX is on in the downlink direction, speech or SID frames are transmitted according to the state of the VAD flag, as was described above in association with the mobile station MS. The VAD 35 sets the state of the VAD flag to 1 or 0 depending on whether speech is occurring or not in signal 31. The TXDTX 33 sets the speech frame SP flag=1 and the SID frame SP flag=0. In addition, the TXDTX 33 generates a SP 2 flag indicating voice activity in the downlink direction to an echo canceller 30 in accordance with the invention, as will be disclosed below. The state of the SP 2 flag is the same as the state of the SP flag in the discontinuous transmission mode. If the TXD X 33 is in the continuous transmission mode, the value of the SP 2 flag is calculated in the same way as in the discontinuous transmission mode, in which case the echo elimination in accordance with the invention does not require the downlink DTX.

The lower part of FIG. 3 shows in the uplink direction the reception units, that is, a RXDTX processor 37 and a speech decoder 38 whose operation and structure are substantially similar to those of the RXDTX processor 27 and the speech decoder 28 in FIG. 2. The RXDTX processes uplink frames arriving from the base station BTS, and a digital 64-kbit/s signal 39 produced by the speech decoder is transmitted to the mobile services switching centre MSC. In the discontinuous transmission mode RXDTX 37 supplies the speech decoder 38 with frames provided with speech parameters provided that the SP flag of the received frame is 1, and frames provided with comfort noise if the SP flag of the received frame is 0.

As It has been illustrated in FIGS. 1 and 2, the speech of a PSTN subscriber 2, transmitted in the downlink direction to the mobile station MS and repeated as an acoustic signal at the loudspeaker 3 or 29, may travel in form of acoustic echo to the microphone 4 or 21 and return along with the uplink signal back to the PSTN subscriber 2. The PSTN subscriber will then hear the echo of his own speech. In a way known per se, an attempt is made to attenuate this acoustic echo in the mobile station MS with an echo canceller. Depending on the quality of the echo canceller, the uplink signal transmitted to the mobile network still contains some residual echo.

In accordance with the present invention, this acoustic echo returning from the mobile station is eliminated with an echo suppressor which is placed on the side of the mobile network, not in the mobile station, which is the case in the prior art solutions. The echo suppressor of the invention may be placed in different alternative locations in the network, such as at the base station, at the base station controller or in the mobile services switching centre. In a preferred embodiment of the invention, the echo suppressor has been implemented in the transcoder unit TRCU, which may be located in any of the above mentioned network elements. An implementation in the transcoder unit is particularly advantageous as the invention may utilize the existing transcoder unit solutions and the speech coding parameters required for echo suppression are easily available.

In the preferred embodiment of the invention, VAD and DTX functions operating both in the transcoder unit TRCU and the mobile station MS are utilized. In the invention, it is monitored whether speech occurs in the downlink signal 31. If speech is detected in the downlink signal 31, the uplink signal received from the mobile station MS is replaced with comfort noise.

In FIG. 3, the echo canceller 30 of the invention is demarcated by a dotted line. In this embodiment, the operation of the echo suppressor requires the use of discontinuous transmission DTX in the uplink direction. Uplink DTX is in use practically all the time, but the method in accordance with the preferred embodiment of the invention is activated only if the uplink DTX is in use. The operation of the echo suppressor 30 is controlled by a control unit 301. An RXDTX processor provides the control unit 301 with a CNU flag and CNU parameters. The CNU flag indicates that the frame in question is a comfort noise parameter updating frame (CNU frame), that is, a valid SID frame. The CNU parameters are the comfort noise updating parameters contained by the CNU frame. In addition, parameters XMAX describing the level of the noise are separated to the control unit 301. The fourth input of the control unit 301 is a SP 2 flag from the TXDTX processor 33. The outputs of the control unit 301 are Forced Comfort Noise Insertion (FCNI) parameters to the comfort noise generator 302, a FCNI flag to a FCNI selector 303 and a GAIN signal to a gain control 304. The FCNI generator 302 generates from the FCNI parameters a FCNI frame containing comfort noise. This FCNI frame is applied to a first input of the selector 303. A speech/SID frame is applied to a second input of the selector 303 from the output of the RXDTX processor. Depending on the state of the FCNI flag, the selector 303 shifts the input of the speech decoder 38 either with the duration of an FCNI frame or a speech/SID frame. The speech signal decoded by the decoder 38 is applied via the gain control 304 to an output 39. The gain of the gain control 304 is e.g. 0 dB or −6 dB depending on the state of the GAIN signal. Attenuation (e.g. −6 dB) is used in the case of double-talk. Alternatively, the gain control may be omitted totally without it having any effect on the operation of the echo suppressor of the invention.

In the following, the echo elimination algorithm carried out by the control unit of FIG. 3 will be explained with reference to block diagrams in FIGS. 4 and 5.

In FIG. 4, step 400 the control unit 301 monitors whether voice activity occurs in the downlink direction. If flag SP 2=1, the continuous transmission mode is on in the downlink direction, or a speech frame is transmitted in the downlink-DTX mode. In case SP 2=0, the downlink signal contains no speech.

Provided that in step 400 SP 2=1, a timer TNORM will be set in step 401. The timer TNORM measures the time that has passed from the transmission of the last downlink speech frame. The timer makes sure that generating forced comfort noise is terminated only when a predetermined delay has passed from the transmission of the last speech frame in the downlink direction. This delay has been chosen so that the echo caused by the last speech frame is allowed to return from the mobile station to the echo suppressor. In other words, the delay is at least equal to the sum of the system and transmission delays from the echo suppressor to the mobile station MS and back.

In step 402, it is checked whether a timer TSUPR is zero. The timer TSUPR measures the time that has passed from the transmission of the first speech frame in the downlink direction. The timer TSUPR determines the time slightly before the acoustic echo of the first speech frame has returned from the mobile station MS to the echo suppressor as the start time for generating comfort noise. The delay of the timer TSUPR is advantageously slightly smaller than the sum of the system and transmission delays from the echo suppressor to the mobile station MS and back.

Provided that the timer TSUPR is not zero in step 402, it is proceeded to step 403. If the timer TSUPR=0, it is proceeded to step 405.

In step 403 it is checked whether the forced comfort noise insertion (FCNI) has already been set. If so, it is proceeded to step 405. If not, it is proceeded to step 406. In step 406 the control unit 301 checks whether the CNU flag of the RXDTX processor 37=1, i.e. whether the received uplink frame is a comfort noise updating (CNU) frame. IL the received frame is a CNU frame, the FCNI parameters are updated in step 407. If a CNU frame is not concerned, it will be proceeded directly to the end. If flag SP 2=0 in step 400, no speech occurs in the downlink direction. It is thus proceeded to step 408, in which the timer TSUPR described above is set. In step 401 it is checked whether the timer TNORM has expired (=0). If the timer TNORM has expired, such a long time has passed from the transmission of the previous downlink frame that the echo of the speech frame has already returned to the echo suppressor. In such a case, generating comfort noise can be terminated. This is carried out in step 410, in which the gain of the gain control is set to 0 dB with signal GAIN and generating comfort noise is terminated (FCNI is reset). In addition, a double-talk mode timer TDBLT is reset. The TDBLT will be described in closer detail below. From step 410 it is proceeded to step 406.

Provided that step 409 provides the result that the timer TNORM has not expired, the echo of the last speech frame has not yet returned to the echo canceller. Thus, it is checked in step 411 whether the FCNI has already been set. If so, it will be proceeded to step 405. If not, it will be proceeded to step 406.

Step 405 contains the steps of the method described in the flow chart in FIG. 5.

FIG. 5 shows the steps of the method for activating forced comfort noise generation FCNI and detecting double-talk. Double-talk refers to a situation in which a downlink signal is interpreted as speech (flag SP 2=1) and the level of the uplink signal is also so high that the uplink signal-probably also contains speech. The echo suppressor of the invention therefore monitors the level of the uplink signal, as well, when speech occurs in the downlink signal. It is easiest to calculate this uplink signal level from such speech parameters of the received speech frame that describe the level of the signal. In the RPE-LTP speech encoding method of the GSM system, such parameters are represented by XMAX parameters. Similar parameters have been used in most modern speech coding methods. When required, the level of the uplink signal may also be calculated from decoded speech samples, but it normally further requires a second decoder for the following reason. The idea of the invention is to generate during possible returning acoustic echo background noise having similar strength and spectral qualities to those in the operating environment of the mobile station at each moment. In order that the level of the uplink signal could be monitored from the sample values during the generation of forced comfort noise FCNI, the received parameters must be decoded in a separate decoder because interfering sounds may be produced when the same decoder is used twice. A simpler solution is to monitor during the FCNI the parameters describing the level of the uplink signal and to make the decision on double-talk on the basis of them. In the embodiment of FIG. 5, double-talk detection is based on the use of XMAX parameters.

Referring to FIG. 5, the control unit 301 sums the XMAX parameters obtained from the speech/SID frame (step 500), the number of which parameters is four per each frame. The control unit 301 then compares the sum of the XMAX parameters with an adaptive threshold level thresh in step 501. If the sum is smaller than the threshold level, there is no speech in the uplink direction, and it s not a question of a double-talk situation, whereby t is tested in step 502 whether the frame in question is a comfort noise updating (CNU) frame. If a CNU frame is in question, the adaptive threshold level thresh is updated. The adaptive threshold level is required since the background noise conditions may vary a great deal during a call and between calls. Therefore, when a fixed uplink threshold value is used, it is difficult to distinguish strong echoes or background noise and actual speech from each other only by means of comparison based on the level. During a normal conversation, when one party is speaking, the other one is silent. Thus, when the uplink DTX is active, the transcoder TRCU receives comfort noise parameter updatings if the background noise is of a relatively stationary nature. It can be assumed that the received comfort noise updatings describe the present background noise level in which case it is also possible to update the adaptive threshold level thres during them. This updated threshold level thres below which the echo biased by the background is assumed to remain is e.g. the sum of the XMAX parameters of one CNU frame added with a specific constant. From step 503, it is proceeded to step 504.

If it is detected in step 502 that the frame in question is not a CNU frame, it is proceeded directly to step 504.

In step 504 it is tested whether the timer TDBLT has expired (=0). The timer TDBLT measures time from detecting the previous double-talk, and it is set in step 510, as will be explained below. Generation of comfort noise is prevented after double-talk until the delay determined by the timer TDBLT has passed. This is due to the fact that it is possible during double-talk that the level of silence sequences of speech (usually voiceless sounds and beginnings) remains below the threshold level thres. The uplink speech could thus be interrupted from time to time. This problem can be prevented by adding a separate delay TDBLT before starting the FCNI. In case the timer TDBLT has not been reset in step 504, it is proceeded to step 511. In case the timer TDBLT has been reset in step 504, it is proceeded to step 505.

In step 505, the gain of the gain control 304 is set to value 0 dB with a signal GAIN.

Thereafter, it is tested in step 506 whether the first CNU frame has been received. This is to make sure that the echo canceller 30 has the updated comfort noise parameters available for it. In case the first CNU frame has not been received, it is proceeded to step 515, from which it is returned to step 406 of FIG. 4. In case the first CNU frame has been received in step 506, the comfort noise generating state FCNI is set in step 507. In other words, the control unit 301 supplies the FCNI generator 302 with the FCNI parameters from which the generator 302 generates a frame containing forced comfort noise to the second input of the selector 303. In addition, the control unit 301 activates a FCNI flag, whereby the selector 303 selects the FCNI frames as the input of the speech decoder 38. Once generating forced comfort noise (FCNI) has been activated in step 507, it is proceeded to step 515.

Provided that in step 501 the sum XMAX is greater than the threshold level thres, it is a question of a double-talk situation, in which speech occurs both in the downlink and uplink directions. It is thus proceeded to step 508, in which it is checked whether the frame in question is a CNU frame. If a CNU frame is in question, the threshold level thres is updated in step 509, whereafter it is proceeded to step 510. If the frame in question is not a CNU frame in step 508, it is proceeded directly to step 510. Steps 508 and 509 thus perform updating completely similar to steps 502 and 503 described above.

In step 510, the timer TDBLT is set. The function of the timer was explained above. Thereafter, it is continued to step 511, in which the FCNI state is reset. Said state has possibly been set in step 507. Resetting means that the FCNI flag is removed and generating FCNI frames is interrupted. The selector 303 thus passes to the speech decoder 38 frames received from the RXDTX processor 37.

In step 512 it is checked whether the first comfort noise updating (CNU) frame has been received. In case the first CNU frame has not been received, the gain of the gain control 304 is set to value 0 dB in step 513, whereafter it is continued to step 515.

Provided that the first CNU frame has been received in step 512, the gain of the gain control 304 is set to value −6 dB in step 514. It is thus possible to attenuate the possible echo in a double-talk Situation by attenuating the entire uplink signal, whereby the actual speech is also attenuated. From step 514 it is continued to step 515.

In an alternative embodiment of the invention, the noise parameters may be generated locally in the echo canceller by means of the uplink signal. In such a case, the operation of the echo suppressor does not require the uplink DTX mode. Generating the comfort noise parameters may be carried out e.g. with an additional encoder and a TXDTX processor. The encoder encodes the output of the decoder 38 into speech parameters, which are converted by the TXDTX processor into noise parameters. These noise parameters provide the CNU parameter input for the control unit 301. The echo suppressor advantageously includes only the parts of the encoder and the TXDTX processor that are necessary for generating the noise parameters.

The echo suppressor may also be placed after the speech coder (transcoder) in the mobile network. In such a case, comfort noise is generated locally, e.g. as in the previous embodiment. Voice activity in the downlink direction is detected with a specific detector. The detector may be carried out e.g. by means of the speech encoder 32, the VAD 35 and the TXDTX processor 33 with the exception that an uncoded signal 31 is transmitted in the downlink direction.

Although the invention has been explained above with reference to certain embodiments only, it is obvious that the explanation is made only by way of example, the embodiments disclosed above allowing alterations and modifications without deviating from the scope and the spirit of the invention set forth in the attached claims.

What is claimed is:

1. A method for eliminating acoustic echo in a digital mobile communications system, which system includes a mobile station and a fixed mobile network in which speech signal transmission occurs on a radio path in an uplink direction from the mobile station to the fixed mobile network and in a downlink direction from the fixed mobile network to the mobile station, and in which a speech coding method is employed on the radio path, the method comprising a step of eliminating acoustic echo, in signals transmitted in the uplink direction, of signals transmitted in the downlink direction, by means of an echo canceller in the mobile station, and in the fixed mobile network, eliminating acoustic residual echo, in signals transmitted in the uplink direction, of signals transmitted in the downlink direction as follows:

monitoring voice activity in signals transmitted in the downlink direction;

monitoring whether a double-talk situation is present or not;

replacing signals transmitted in the uplink direction with noise after a predetermined delay when detecting voice activity in signals transmitted in the downlink direction;

terminating the replacing of signals transmitted in the uplink direction with noise after a predetermined delay when detecting the end of voice activity in signals transmitted in the downlink direction; and preventing signals transmitted in the uplink direction from being replaced with noise when a double-talk situation is detected.

2. The method as claimed in claim 1, wherein said noise is comfort noise, which is similar to background noise in the operating environment of the mobile station, the method comprising the further steps of:

coding speech signals at a first transmission rate for the duration of transmission into speech parameters of a speech encoding method at a second transmission rate lower than the first transmission rate, employing, at least in the uplink direction, discontinuous transmission in which a) transmission from the mobile station to the radio path is interrupted during pauses occurring in speech and comfort noise parameters containing information on the background noise are transmitted at specific intervals;

b) comfort noise is generated in a speech decoder of the fixed mobile network by means of the speech parameters of the speech coding method during the pauses in speech in the uplink direction.

3. The method as claimed in claim 1, wherein said step of double-talk monitoring comprises:

comparing the level of signals transmitted in the uplink direction with a threshold level during a voice activity in the downlink direction;

detecting a double-talk situation when the level of the signals transmitted in the uplink signal exceeds said threshold level.

4. The method as claimed in claim 3, comprising steps of determining a double-talk situation when the level of signals in the uplink direction exceeds said threshold level.

5. The method as claimed in claim 3, comprising updating said threshold level on the basis of speech parameters received in comfort noise updating frames and representing the noise level.

6. The method as claimed in claim 1, comprising the further steps of analyzing, in the mobile station, the background noise of the operating environment of the mobile station, generating, in the mobile station, comfort noise parameters representing said background noise, transmitting said comfort noise parameters from the mobile station to the fixed mobile network, generating, in the fixed mobile station, on the basis of said comfort noise parameters received from the mobile station, noise that replaces signals transmitted in the uplink direction if a presence of echo of signals transmitted in the downlink direction is detected in signals transmitted in the uplink direction.

7. The method as claimed in claim 1, comprising a further step of attenuating an outgoing signal in the uplink direction in a double-talk situation.

8. A device for eliminating acoustic echo returning from a mobile station in a digital mobile communications system, the system including the mobile station and a fixed mobile network in which speech signal transmission occurs on a radio path in an uplink direction from the mobile station to the fixed mobile network, and in a downlink direction from the fixed mobile network to the mobile station, and the system employing a parametric speech coding method for lowering the transfer rate at a radio interface, the mobile station comprising an echo canceller for attenuating acoustic echo in the mobile station prior to transmitting signals in the uplink direction over the radio interface to the fixed mobile network, said device being an echo suppressor placed in the fixed mobile network for eliminating any residual echo of the echo canceller of the mobile station appearing in signals transmitted in the uplink direction received over the radio interface, the echo suppressor comprising:

a voice activity detector for detecting voice activity in signals transmitted in the downlink direction;

a double-talk detector; and means for replacing signals transmitted in the uplink direction with noise after a predetermined delay when detecting voice activity in signals transmitted in the downlink direction by the voice activity detector.

9. The device as claimed in claim 8, wherein said noise is comfort noise which is similar to the background noise in the operating environment of the mobile station and said replacing means are arranged to start generating comfort noise after a predetermined delay from detecting voice activity in signals transmitted in the downlink direction; and said replacing means are arranged to terminate generating comfort noise after a predetermined delay from detecting the end of voice activity in signals transmitted in the downlink direction.

10. The device as claimed in claim 8, wherein said replacing means comprise:

a comfort noise generator that generates speech parameters containing noise similar to the background noise in the operating environment of the mobile station; and a selector having a first state, in which it selects as an input of a speech decoder the speech parameters received from the mobile station, and a second state, in which it selects as the input of the speech decoder the speech parameters generated by the comfort noise generator, wherein the selector shifts from the first state to the second state after a predetermined delay when voice activity is detected in signals transmitted in the downlink direction, the selector shifts from the second state to the first state after a predetermined delay when the end of voice activity is detected in signals transmitted in the downlink direction, and said double-talk detector forces the selector to the first state when a double-talk situation is detected.

11. The device as claimed in claim 8, wherein said noise is comfort noise which is similar to the background noise in the operating environment of the mobile station, analysis of the comfort noise and generating the comfort noise parameters being placed in the mobile station, and generation of the comfort noise in the echo suppressor being based on the comfort noise parameters received from the mobile station.

12. The device as claimed in claim 8, wherein the echo suppressor is located in a transcoder unit.

* * * * *